Patented Dec. 19, 1939

2,184,062

UNITED STATES PATENT OFFICE 2,184,062

MANUFACTURE OF HYDROCYANIC ACID

Charles Roberts Harris, Niagara Falls, N. Y., assignor to E. I. du Pont de Nemours & Company, Inc., Wilmington, Del., a corporation of Delaware No Drawing. Application August 2, 1934, Serial No. 738,050

14 Claims. (Cl. 23—151)

This invention relates to manufacture of hydrocyanic acid and more particularly to the production of hydrocyanic acid by reacting nitric oxide with a hydrocarbon.

It has been known heretofore that nitric oxide may be reacted with hydrocarbon in the presence of a platinum catalyst to produce hydrocyanic acid. Thus in 1841, Kuhlmann (Liebig's Annalen, vol. 29, page 286) obtained ammonium cyanide by passing a mixture of ethylene and nitric oxide over heated platinum. Certain disadvantages attend this catalytic method. In the first place the catalyst is expensive and must be carefully prepared in order to produce good yields of hydrocyanic acid. The catalyst must be carefully protected from impurities in the raw materials to prevent catalyst poisoning and even when all precautions for this purpose are taken, the catalyst is liable to become fouled by carbon formed by decomposition of the hydrocarbon, unless carefully controlled conditions are maintained.

An attempt to produce hydrocyanic acid by reacting nitric oxide with hydrocarbons without the use of a catalyst is described by Elöd and Nedelmann, Zeitschrift für Elektrochemie, vol. 33 pp. 221–222. These authors obtained a high yield of hydrocyanic acid but it was accompanied by a heavy deposit of carbon and the formation of large amount of polymeric substances. Their results indicate that the formation of carbon and polymers might be avoided by using sufficiently low temperatures; however, at the lower temperatures the yield of hydrocyanic acid was poor. Thus, while Elöd's and Nedelmann's method is capable of producing high yields of hydrocyanic acid, it is unsuitable for economical commercial use because of the formation of large amounts of carbon and polymer at the temperatures required for reasonable yields of the product. The heavy formation of carbon and polymer requires that the process be shut down at frequent intervals to clean out the reaction apparatus, and hence prevents continuous and economic operation.

An object of the present invention is to provide an improved process for manufacture of hydrocyanic acid by the reaction of nitric oxide with a hydrocarbon in the absence of a catalyst. A further object is to prevent the formation of carbon and polymerization products in the non-catalytic reaction of nitric oxide and hydrocarbons.

I have discovered that nitric oxide and a hydrocarbon may be reacted together to form hydrocyanic acid in an efficient and continuous manner to produce hydrocyanic acid in high yields, without substantial amounts of carbon deposition and/or polymer formation, by using a large excess of hydrocarbon and diluting the reaction mixture with appreciable quantities of inert gas. I have further discovered that the addition of a small amount of water vapor to the reaction mixture has a marked effect in decreasing carbon formation. That is, a small amount of water vapor decreases the amount of carbon formed to a greater extent than the addition of a like amount of inert gas. My invention also comprises the addition of substantial amounts of oxygen to the reaction mixture. The oxygen reacts with part of the excess hydrocarbon used to form water which has the above mentioned effect of preventing carbon segregation and furthermore the oxidation of the hydrocarbon furnishes part of the heat required for heating the gases to the reaction temperature.

In accordance with one method of practicing my invention, I prepare a reaction mixture of 1 volume of nitric oxide, about 4 volumes of a hydrocarbon vapor and 6–8 volumes of an inert gas. The reaction mixture or one or more components thereof is preheated and the hot mixture is continuously passed through a heated refractory reaction chamber, where it is exposed from 3–7 seconds to a temperature of 800–1400° C., preferably 1100° to 1300° C. The out gases are treated by known methods to separate the hydrocyanic acid formed, for example, by water scrubbing and distillation to recover pure hydrocyanic acid or by reaction, e. g. with alkali, to produce valuable products.

In order to initiate the reaction, the reaction mixture must be brought to a reacting temperature, which ordinarily is not below about 600° C. The reaction mixture may be preheated to the reacting temperature by any suitable means or components of the mixture may be heated before mixing.

The above described method of operation results in high yields of hydrocyanic acid with little or no carbon deposition. Some hydrocarbons, e. g., unsaturated hydrocarbons and especially the aromatic hydrocarbons have a greater tendency towards carbon formation than others, such as paraffin hydrocarbons. In operating the above described process with unsaturated hydrocarbons, a certain amount of carbon ordinarily is formed; however, this amount of carbon deposition is less than that formed in prior non-catalytic methods of reacting nitric oxide with hydrocarbons to produce hydrocyanic acid. In practicing this process, I have not observed the formation of any appreciable amounts of hydrocarbon polymer.

In order to further decrease the amount of carbon deposition I may add small amounts of water vapor to the reaction mixture. The amount of water vapor added may be around 10% by volume of the reaction mixture. My process, however, is not restricted to the use of small amounts of water vapor; I may add as much as 40% or more of the total reaction volume of water vapor.

Although the reaction between nitric oxide and a hydrocarbon is an exothermic one, considerable heat is required to bring the diluted reacting gases to the reaction temperature and, since the high temperature of the reaction requires a non-metallic reaction apparatus, the question of heat input becomes a difficult problem for large scale apparatus. I have found that this problem of heat input may be satisfactorily solved for large scale production by adding substantial amounts of oxygen or air to the reaction mixture. The oxygen reacts with part of the excess hydrocarbon present to generate heat within the reaction mixture; if desired, sufficient oxygen may be added to a hot reaction mixture which has been previously preheated, so that substantially no external application of heat is required in the reaction chamber. The amount of oxygen added to the reaction mixture may be varied, depending upon the amount of heat required to be generated by oxidation of the hydrocarbons within the reaction mixture. I prefer to employ not more than 1 volume of oxygen for each volume of nitric oxide that is reacted. A further advantage of the addition of oxygen is that by reason of its reaction with the hydrocarbon, a certain amount of water vapor is formed which functions to prevent carbon formation, as explained above.

Nitric oxide prepared by various known methods may be used in my process. I prefer to obtain nitric oxide by oxidizing ammonia with an excess of air in the presence of a suitable ammonia oxidation catalyst and use the resulting hot oxidation product directly for making up my reaction mixture. This method is highly advantageous from an economical standpoint because the heat of the ammonia oxidation reaction is utilized to heat the reaction mixture. Furthermore, by using a sufficient excess of air in the ammonia oxidation step I obtain a hot mixture of nitric oxide, water vapor, oxygen and relatively large amounts of nitrogen, which may be mixed with a suitable proportion of hydrocarbon vapor to produce a reaction mixture having the various gases in suitable proportions for obtaining the maximum yield of hydrocyanic acid by the reaction of the nitric oxide and hydrocarbon in accordance with my invention. To adjust the proportions of the gases in the reaction mixture it is only necessary to adjust first, the amount of air used to oxidize the ammonia and secondly, the amount of hydrocarbon mixed with the hot ammonia oxidation product. If desired, pure oxygen may be used in place of air to oxidize the ammonia; however, it is ordinarily preferable to use air. By the use of suitable heat exchange arrangements, the heat of the off gas of the final reaction may be utilized to preheat the air and/or ammonia for the ammonia oxidation step and also, if desired, to preheat the hydrocarbon before it is mixed with the ammonia oxidation product. If suitable proportions of air and hydrocarbon are thus used in this two-stage process, the entire process may thus be made substantially thermally self-sustaining. This two-stage method of practicing my invention is illustrated by the following examples.

*Example 1*

Ammonia was oxidized by passing a mixture of one volume of ammonia with 10 volumes of preheated air over a catalyst consisting of a wire gauze made of a platinum-rhodium alloy. The hot reaction mixed gases coming from the ammonia oxidation apparatus were mixed with 4 volumes of methane and the resulting mixture was passed through a silica tube heated in an electric resistance furnace. The maximum temperature in the quartz reaction tube was maintained at about 1300° C., while the gases were passed through at such rate as to require 3 to 6 seconds to pass through the zone of maximum temperature. The hydrocyanic acid formed was separated from the off-gases by absorption and caustic soda solution. The yield of hydrocyanic gas was 59.5% based on the amount of ammonia originally taken.

*Example 2*

The method of Example 1 was used to react nitric oxide with propane, butane, and gasoline respectively. The procedure was identical with that in Example 1 in these runs except that the ratio of ammonia to hydrocarbons used was varied. Also in the operation employing gasoline, the gasoline was vaporized before mixing it with the reaction mixture. The results obtained are shown in the following table:

| Hydrocarbon | Ratio ammonia to hydrocarbon | Reaction temperature | Yield of HCN (based on $NH_3$ used) |
|---|---|---|---|
| | | °C. | Percent |
| Propane | 1:1.08 | 1200 | 54 |
| Butane | 1:1.08 | 1200 | 54 |
| Gasoline vapor (About $C_9H_{20}$) | *1:0.55 | 1160–1180 | 50 |

*92.5 volumes of $NH_3$ gas to 0.35 volume of liquid gasoline, $C_9H_{20}$.

*Example 3*

Ethylene and propylene were reacted with nitric oxide according to the method of Example 1. The data and results obtained are shown in the following table:

| Hydrocarbon | Ratio $NH_3$ to hydrocarbon | Reaction temperature | Yield of HCN (based on) $NH_3$ used) |
|---|---|---|---|
| | | °C. | Percent |
| Ethylene | 1:2.75 | 1200 | 65.9 |
| Propylene | 1:1.75 | 1100 | 62.3 |

In addition to the hydrocarbons shown in the above examples, I have reacted aromatic hydrocarbons such as benzene and naphthalene with nitric oxide by my method to produce hydrocyanic acid in good yields.

The proportion of hydrocarbon to nitric oxide in the reaction mixture in my process may vary considerably, provided the portion of hydrocarbon is equivalent to at least two atoms of carbon for each molecule of nitric oxide reacted in the reaction mixture. I prefer to employ a quantity of hydrocarbon equivalent to about 4 atoms of carbon per molecule of nitric oxide. Obviously the amount of hydrocarbon required for reaction mixture containing nitric oxide and hydrocarbon in the ratio of 1 molecule of nitric oxide to 4 carbon atoms will vary depending upon the molecular weight of the hydrocarbon. For example for the 4:1 ratio, for each volume of nitric oxide used 4 volumes of methane will be required, or 2 volumes of ethane or 1 volume of butane. The carbon to nitric oxide ratio may vary between 2:1 to 8:1, with satisfactory results.

An advantage of my invention is that it enables the production of hydrocyanic acid in good yields and provides an efficient and continuous process with no troubles caused by carbon deposition or polymer formation. The process is adapted to use of unsaturated hydrocarbons and aromatic hydrocarbons and higher hydrocarbons such as butane, which compounds are especially subject to cracking with consequent carbon and polymer formation at the high temperatures used; my method appears to inhibit the cracking. The process avoids the use of catalyst in the nitric oxide hydrocarbon reaction, and thereby avoids the expense of preparing and replacing catalyst. Furthermore, since no catalyst is used, the raw materials do not need to be especially purified to remove catalyst poisons. The use of oxygen as above described in my process results in an efficient thermally self-sustaining process.

I claim:

1. A process for the manufacture of hydrocyanic acid comprising heating a gaseous mixture containing one volume of nitric oxide, a hydrocarbon in an amount equivalent to at least 2 carbon atoms per mole of nitric oxide, 2 to 10 volumes of an inert gas, water vapor in an amount equivalent to about 10 to 40% by volume, a quantity of oxygen sufficient to oxidize a part of the excess hydrocarbon at a temperature of 800° to 1400° C., in the absence of a catalyst.

2. A process for the manufacture of hydrocyanic acid comprising heating a gaseous mixture containing one volume of nitric oxide, methane in excess of that required to react with the nitric oxide, 2 to 10 volumes of an inert gas, water vapor in an amount equivalent to at least about 10% by volume, and a quantity of oxygen sufficient to oxidize a part of the excess hydrocarbon, at a temperature of 1100° to 1300° C., in the absence of a catalyst.

3. A process for the manufacture of hydrocyanic acid comprising reacting at a temperature of 800° to 1400° C. in the absence of a catalyst a gaseous mixture containing one volume of nitric oxide, ethylene in excess of that required to react with the nitric oxide, 2 to 10 volumes of an inert gas, water vapor in an amount equivalent to at least about 10% by volume and a quantity of oxygen sufficient to oxidide a part of the excess hydrocarbon.

4. A process for the manufacture of hydrocyanic acid comprising passing through an unpacked reaction space, a hot, gaseous mixture containing one volume of nitric oxide, hydrocarbon in an amount equivalent to 2 to 8 carbon atoms per mole of nitric oxide, 2 to 10 volumes of nitrogen and water vapor in an amount equivalent to about 10 to 40% by volume, the temperature of said mixture being so adjusted that the components of the mixture will react at a temperature of 1100° to 1300° C.

5. A process for the manufacture of hydrocyanic acid comprising catalytically oxidizing ammonia with an excess of air, mixing the resulting hot mixture of nitric oxide, water vapor, nitrogen and oxygen with an amount of hydrocarbon equivalent to about 2 to 8 carbon atoms per mole of ammonia oxidized and passing the final mixture through an unpacked reaction space at a temperature of 800° to 1400° C.

6. A process for the manufacture of hydrocyanic acid comprising catalytically oxidizing ammonia with about 8 to 10 volumes of air to one volume of ammonia, mixing the resulting hot mixture of nitric oxide, water vapor, nitrogen and oxygen with an amount of hydrocarbon equivalent to about 2 to 8 carbon atoms per mole of ammonia oxidized and passing the final mixture through an unpacked reaction space at a temperature of 1100° to 1300° C.

7. A process for the manufacture of hydrocyanic acid comprising reacting nitric acid with an excess of hydrocarbon in the absence of a catalyst at a temperature of 800 to 1400° C., the reaction occurring in the presence initially of at least one volume of water vapor and 2 to 10 volumes of an inert gas per volume of nitric oxide.

8. A process for the manufacture of hydrocyanic acid comprising catalytically oxidizing ammonia with an excess of air and directly reacting the resulting hot gaseous oxidation product containing water vapor with an excess of hydrocarbon in the absence of a catalyst at a temperature of 800 to 1400° C.

9. A process for the manufacture of hydrocyanic acid comprising reacting nitric oxide with an excess of hydrocarbon at a temperature of 800 to 1400° C., in the absence of a catalyst and in the presence of 2 to 10 volumes of inert gas per volume of nitric oxide, the reaction mixture initially containing at least about 10% by volume of water vapor.

10. A process for the manufacture of hydrocyanic acid comprising reacting an excess of methane at a temperature of 1100 to 1300° C. in the absence of a catalyst with a gas mixture containing nitric oxide and not less than about 1.5 volume of water vapor per volume of nitric oxide, said gas mixture being obtained by catalytically oxidizing ammonia with an excess of air.

11. A process for the manufacture of hydrocyanic acid comprising reacting an excess of ethylene at a temperature of 1100 to 1300° C. in the absence of a catalyst with a gas mixture containing nitric oxide and not less than about 1.5 volume of water vapor per volume of nitric oxide, said gas mixture being obtained by catalytically oxidizing ammonia with an excess of air.

12. A process for the manufacture of hydrocyanic acid comprising reacting an excess of hydrocarbon at a temperature of 1100 to 1300° C. in the absence of a catalyst with a gas mixture containing nitric oxide and not less than about 1.5 volume of water vapor per volume of nitric oxide, said gas mixture being obtained by catalytically oxidizing ammonia with an excess of air.

13. A process for producing hydrocyanic acid comprising oxidizing ammonia with an oxygen containing gas so as to obtain a hot mixture of nitrogen, water vapor and an oxide of nitrogen, mixing said hot mixture with an excess of a saturated aliphatic hydrocarbon and maintaining the resulting mixture at an elevated temperature in the absence of a catalyst until substantial conversion of hydrocarbon to hydrocyanic acid is obtained.

14. A process for producing hydrocyanic acid comprising catalytically oxidizing ammonia with an oxygen containing gas so as to obtain a hot mixture of nitrogen, water vapor and an oxide of nitrogen, mixing said hot mixture with an excess of a saturated aliphatic hydrocarbon and maintaining the resulting mixture at an elevated temperature in the absence of a catalyst until substantial conversion of hydrocarbon to hydrocyanic acid is obtained.

CHARLES ROBERTS HARRIS.